(12) United States Patent
Cox et al.

(10) Patent No.: US 9,311,225 B2
(45) Date of Patent: Apr. 12, 2016

(54) DMA CHANNELS

(71) Applicant: Microsoft Corporation, Redmond, WA (US)

(72) Inventors: Shaun David Cox, Kirkland, WA (US); Fehim Soner Terek, Bellevue, WA (US); Jinsong Yu, Bellevue, WA (US); Christopher Wellington Brumme, Mercer Island, WA (US); Gregory Michael Neverov, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 399 days.

(21) Appl. No.: 13/734,708

(22) Filed: Jan. 4, 2013

(65) Prior Publication Data

US 2014/0195746 A1  Jul. 10, 2014

(51) Int. Cl.
*G06F 12/00* (2006.01)
*G06F 13/10* (2006.01)
*G06F 13/00* (2006.01)
*G06F 13/28* (2006.01)

(52) U.S. Cl.
CPC .............. *G06F 12/00* (2013.01); *G06F 13/102* (2013.01); *G06F 13/28* (2013.01)

(58) Field of Classification Search
CPC ....... G06F 12/00; G06F 13/00; G06F 13/102; G06F 13/28

USPC ............. 711/154; 710/22; 719/321; 709/212, 709/250

See application file for complete search history.

(56) References Cited

U.S. PATENT DOCUMENTS

| | | | |
|---|---|---|---|
| 8,185,783 B2 | 5/2012 | Lee et al. | |
| 2004/0103225 A1 | 5/2004 | McAlpine et al. | |
| 2005/0015469 A1* | 1/2005 | Zuberi | ......................... 709/220 |
| 2006/0075119 A1* | 4/2006 | Hussain et al. | ............... 709/227 |
| 2009/0063718 A1 | 3/2009 | Sekine et al. | |
| 2009/0064196 A1 | 3/2009 | Richardson et al. | |
| 2012/0246614 A1 | 9/2012 | Sliwowicz | |
| 2012/0246635 A1 | 9/2012 | Kennedy et al. | |

OTHER PUBLICATIONS

Amar, et al., "Generic Driver Model using Hardware Abstraction and Standard APIs", Retrieved on: Nov. 27, 2012, Available at: http://www.design-reuse.com/articles/18584/generic-driver-model.html.
B, Saha, "CIRUS A Scalable Modular Architecture for Reusable Drivers", In 48th ACM/EDAC/IEEE Design Automation Conference, Jun. 5, 2011, 2 pages.

(Continued)

*Primary Examiner* — Mark Giardino, Jr.
(74) *Attorney, Agent, or Firm* — Henry Gabryjelski; Raghu Chinagudabha; Micky Minhas

(57) ABSTRACT

Communicating between an application and a hardware device. A method includes an application writing data to host physical memory using an application view of the memory. The method further includes mapping the data in the physical memory to a hardware driver view, usable by a hardware driver, without needing to copy the data to a different physical storage location. The method further includes mapping the data to a hardware accessible view accessible by a hardware device without needing to copy the data to a different physical storage location.

19 Claims, 3 Drawing Sheets

(56) References Cited

OTHER PUBLICATIONS

McLemore, et al., "Planning Your Device Driver", Published on: Mar. 2011, Available at: http://www.google.co.in/url?sa=t&rct=j&q=planning%20your%20device%20driver%20abstract&source=web&cd=1&cad=rja&ved=0CDAQFjAA&url=http%3A%2F%2Fdownload.microsoft.com%2Fdownload%2F2%2F4%2FA%2F24A36661-A629-4CE6-A615-6B2910A1367A%2FPlanning%2520Your%2520Device%2520Driver.pdf&ei=ZQC3UNWDDIOsrAf5w4C4Dg&usg=AFQjCNFqPvSkkEd5NIKNLhMdqXiweujQng.

"Abstract Driver Bundle", Retrieved on: Nov. 28, 2012, Available at: http://dz.prosyst.com/pdoc/mBS_Ext/um_sh/framework-ee-addon/bundles/device/abstractdriver/abstractdriver.html.

Katayama, et al., "A Method for Automatic Generation of Device Drivers with a Formal Specification Language", Retrieved on: Nov. 28, 2012, Available at: http://earth.cs.miyazaki-u.ac.jp/~kat/papers/pdf/iwpse98.pdf.

Pai V. S. et al., "IO-Lite: A Unified I/O Buffering and Caching System", 3rd Symposium on Operating Systems Design and Implementation, Feb. 22-25, 1999, New orleans, LA, USENIX Association, US, 15 pages.

"International Search Report & Written Opinion for PCT Patent Application No. PCT/US2014/010119", Mailed Date: Mar. 24, 2014, Filed Date: Jan. 3, 2014, 7 Pages.

* cited by examiner

DMA CHANNELS

BACKGROUND

Background and Relevant Art

Computers and computing systems have affected nearly every aspect of modern living. Computers are generally involved in work, recreation, healthcare, transportation, entertainment, household management, etc.

Computers are often used with hardware devices. For example, a computer may connect a network card to a communication bus and may use the network card to communicate data to other computer systems. To use hardware devices, the computer will typically have a driver than enables communication between applications on the computer and the hardware device. For devices that require low-latency and high performance, the computer will often implement drivers in kernel mode to allow for a tighter integration with the computer processor and memory.

Some unique operating systems may need to avoid kernel mode transitions and rather function in a type safe environment. These operating systems are implemented on message-passing oriented platforms where different applications and processes can communicate by passing messages to each other which includes copying data to and from various memory locations.

Building a high-performance hardware device stack (such as a network stack) is often difficult in message-passing oriented platforms due to the copies of data that are typically made when passing data from an application to hardware driver and vice-versa.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for communicating between an application and a hardware device. The method includes an application writing data to host physical memory using an application view of the memory. The method further includes mapping the data in the physical memory to a hardware driver view, usable by a hardware driver, without needing to copy the data to a different physical storage location. The method further includes mapping the data to a hardware accessible view accessible by a hardware device without needing to copy the data to a different physical storage location.

Another embodiment illustrated herein includes a method that may be practiced in a computing environment. The method includes acts for communicating between an application and a hardware device. The method includes a hardware device writing data to host physical memory using a hardware view of the memory. The method further includes mapping the data in the physical memory to a hardware driver view, usable by a hardware driver, without needing to copy the data to a different physical storage location. The method further includes mapping the data to an application accessible view accessible by an application without needing to copy the data to a different physical storage location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein may implement Inter-Process Communication (IPC) and Direct Memory Access (DMA) channels using a common piece of physical memory such that hardware communication can be accomplished with the speed and efficiency of DMA style channels while being able to be used in IPC channel style communication for message passing platforms. Thus, embodiments may implement a DMA channel that integrates the architectural cleanliness of a regular IPC channel and message passing with the high-performance of DMA by hardware devices. Embodiments may also implement simplified flow-control (backpressure) to prevent over-production and eliminate the need to re-queue data in downstream queues of a software or hardware stack.

Figure 1:
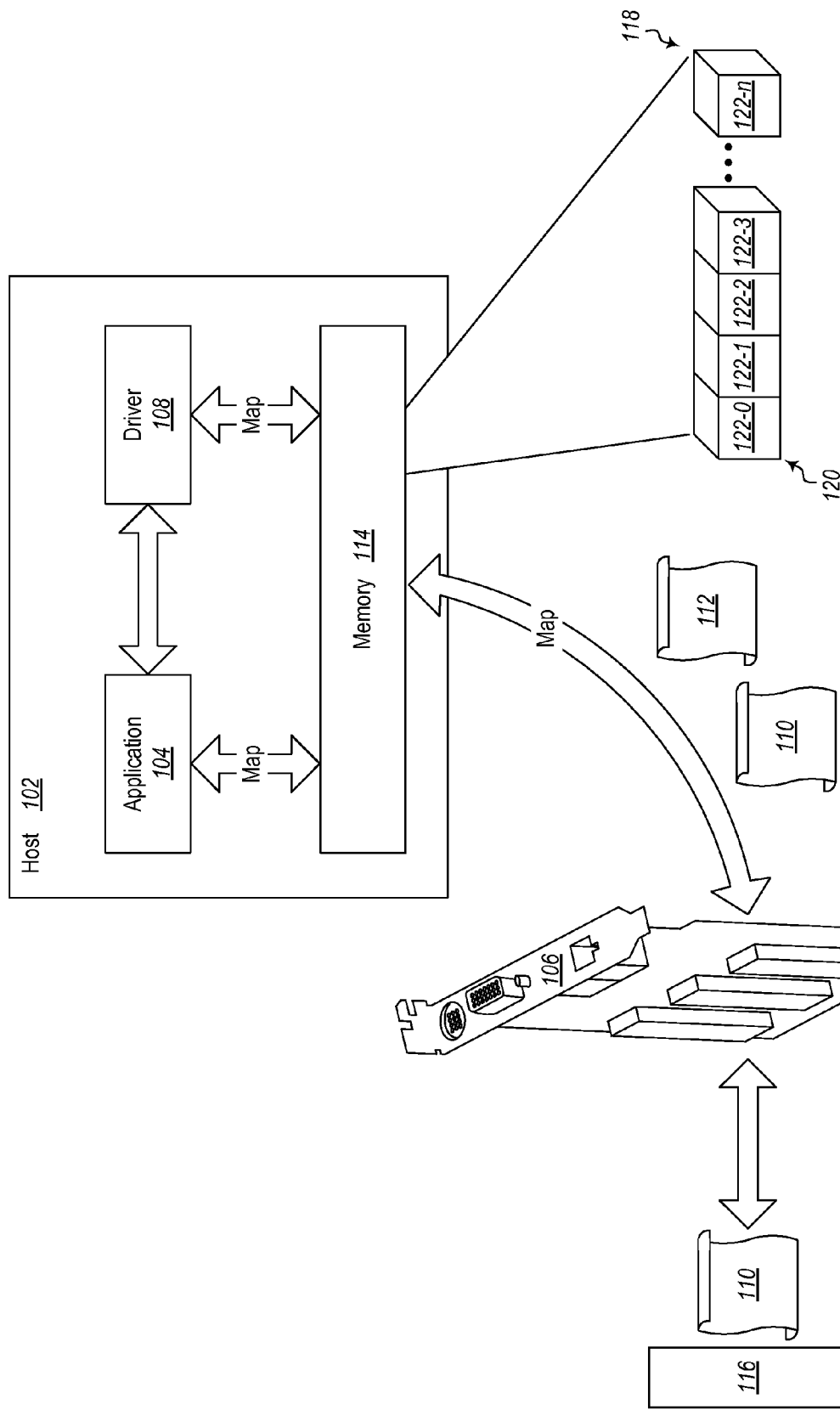
FIG. 1 illustrates an implementation of a hardware device connected to a host system.

Referring now to FIG. 1, an example is illustrated. FIG. 1 illustrates a host 102. The host 102 includes one or more applications, such as the example, application 104. The host 102 is also connected to a hardware device 106. In the example illustrated in FIG. 1, the hardware device 106 is illustrated as a network interface card (NIC). The hardware device 106 may be interconnected with the host 102 using a communication bus, such as a PCI, SCSI, USB, SATA, Infini-Band, I²C, etc.

Often control of the hardware device 106 may be accomplished using a device driver 108. The device driver 108 will typically be used to transmit payload data and control data to the hardware device 106. For example, the application 104 may need to transmit data from the host 102 to an application on a different computing system using the NIC hardware device 106. The data intended to be transmitted from the application 104 to an application on another system is the payload data 110. Control data 112 is used to control the hardware device 106. For example, the control data 112 may indicate to a NIC hardware device 106 that it should send another payload data frame to another system, or that it should receive another payload data frame from another system.

Some embodiments described herein are able to limit the amount of copying of data for both payload data 110 and control data 112 by using mapping of data in system memory 114. In particular, an application 104 can write data to, and read data from, memory 114 using a mapping that maps an application view of the memory 114. Further, the driver 108 can read and add data to the memory 114 by the data memory being mapped to a hardware driver view. Further, the hardware device 106 can also read data from, and write data to, the memory 114 using a hardware view of the memory.

Notably, several enhanced features can be realized by using such an arrangement. Several of these enhanced features will be now illustrated.

One feature includes the integration of a normal IPC channel's ring buffer being backed by memory 114 that can be mapped ahead of time for the various views discussed above for DMA read operations by devices 106. This can eliminate the need to expensively map and unmap individual transfer requests from host 102 to device 106.

Embodiments can further leverage the fact that the destination for small transfers is the IPC channel itself, which can be mapped once by mapping the driver view and the hardware view of the memory 114 which remains mapped for many independent transfers. For example, the application 104 can write a large amount of payload data to the memory 114 using an application view of the memory. The application 104 can call the driver 108 to indicate to the driver that the driver 108 should use the hardware device 106 to transfer the payload data 110 to a different system 116. The driver 108 can write all of the data frame transfer commands (i.e. control data 112) to the memory 114 needed to transfer a large portion or all of the payload data 110 to the different system 116. The driver 108 can then issue very small commands to point to each of the data frame commands (i.e. the control data 112). For example, control data can be written to a known chunk 118 of the memory 114. Then, to issue a control command, driver 108 only needs to reference a base address 120 of the memory and an offset illustrated by the offsets 122-0 (which is at the base address being an offset of 0) and 122-n. Thus, the driver 108 does not need to issue a full data frame command or set of commands, but can simply issue an address and an offset making control data transfers very efficient.

Thus, embodiments may leverage the handle-transfer semantics of some IPC channel implementations to allow a producer to stage a large chunk 108 of shared memory inside the device driver 108 with a specific type of IPC channel message and then at future multiple times to reference smaller ranges of that staged memory for DMA read operations by the device 106. These DMA operations are triggered in the same way (by sending IPC messages in the channel) but are processed by the target differently to reference the correct location (such as by indication of a base address and an offset) within the previously staged chunk 118 of shared memory for the DMA operation rather than the portion of the IPC channel itself which holds the message. Embodiments apply this functionality between an arbitrary producer process and the target device driver 108 process. The net effect is fewer handles transferred between processes and fewer map/unmap calls to pin the memory down to make it accessible for DMA operations Embodiments may use features of the invention to easily implement flow-controlling (limiting over production of work) many channel producers by leaving message data in the channel until DMA operations downstream complete. For example, Embodiments may build on regular shared-memory ring buffers representing one-way IPC channels between two processes. Regular shared-memory ring buffers use this mechanism to copy small messages representing instructions or data from one process to another. Of relevance is the fact that flow-control is achieved by the producer witnessing the fact that the channel is full (or the consumer indicating it can take no more new messages) and this causes the producer to pause its production of new messages. When the consumer has retired (finished processing older messages in the channel) that fact is signaled to the producer who resumes production by using the newly freed region of the ring buffer for new messages. Embodiments may extend this mechanism by arranging for the IPC channel to be backed by memory 114 that is mapped (using the various views discussed above) for DMA read operations by some device 106. Typically the channel's target endpoint is the device driver 108 process for that device 106. Embodiments may also implement extended APIs for consuming messages from the channel to allow them to be peeked at (contents read from the channel directly) separately from being retired (contents removed from the channel freeing up space for the producer to reuse). In between being peeked at and retired, the device driver 108 will arrange for the hardware to perform a DMA read operation directly from the channel (avoiding a copy) and will wait until the device 106 has signaled this operation is completed before retiring the contents of the message(s) from the channel and unblocking the producer (e.g. the application 104) to reuse that area of the channel for new messages.

Another enhancement that may be realized includes the elimination of intermediate queues or data buffers, which are detrimental to latency, memory usage and potential second order transient system dynamics. Rather, by using the various views, including the application view, the driver view, and the device view, data can be transferred, buffered and queued with minimal to no copying of the data.

Embodiments may implement a multiplexer that can be easily introduced between many source channels and the target device 106. This allows for fair shared access to the target device 106 from many independent producer processes (such as various different applications); each connected with their own channel to the target device driver 108 process.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
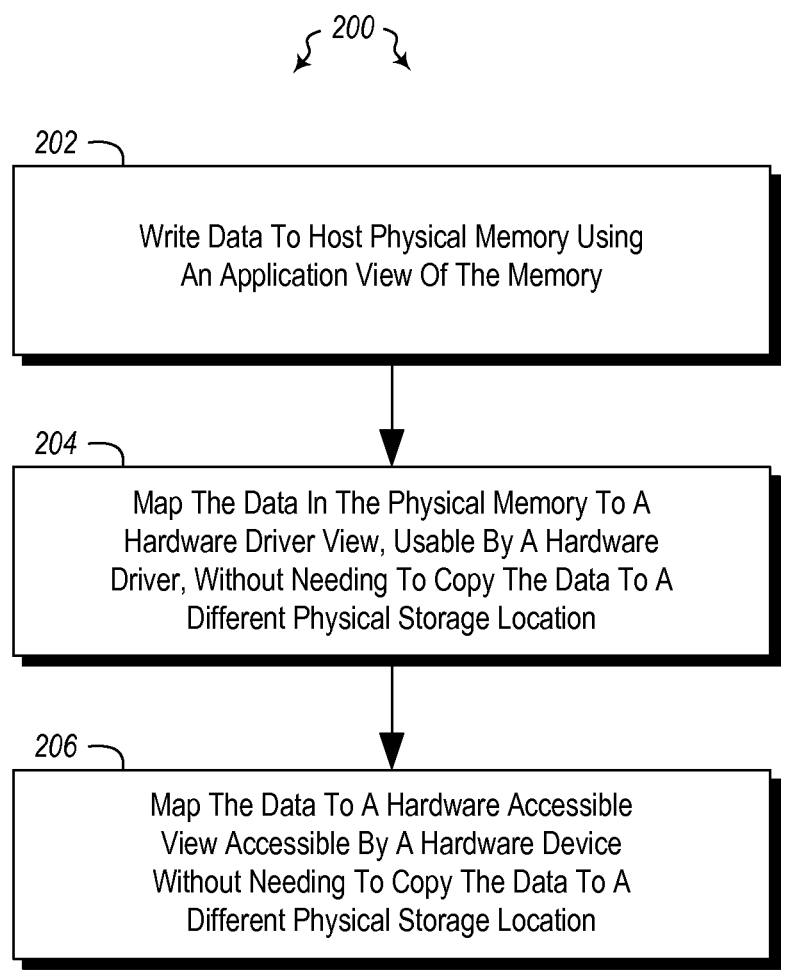
FIG. 2 illustrates a method of communicating between an application and a hardware device.

Referring now to FIG. 2, a method 200 is illustrated. The method 200 may be practiced in a computing environment and includes acts for communicating between an application and a hardware device. The method includes an application writing data to host physical memory using an application view of the memory (act 202). For example, as illustrated in FIG. 1, the application 104 may write to the memory 114 using a mapped view of the memory 114.

The method 200 further includes mapping the data in the physical memory to a hardware driver view, usable by a hardware driver, without needing to copy the data to a different physical storage location (act 204). For example, a view of the memory 114 may be created for use with the driver 108. The view allows the driver to access data and write control data to the memory 114.

The method 200 further includes mapping the data to a hardware accessible view accessible by a hardware device without needing to copy the data to a different physical storage location (act 206). For example, a view of the memory 114 may be created for the hardware device 106 by mapping the memory 114. This allows the hardware device to be sent control data 112 and payload data 110 directly from the memory 114.

As noted above, the method 200 may be practiced where the physical memory comprises payload data and control messages. For example, as illustrated in FIG. 1, the memory 114 may include both payload data 110 and control data 112. In some embodiments, the hardware device 106 may be a network interface card. The payload data 110 may include data frames to be transmitted on a network to a different system 116.

In some such embodiments, flow control can be accomplished by leaving the payload data and control data in the physical memory until the hardware device has provided an indication (such as an interrupt) indicating completion of an operation. This can be done without needing to retire data from the physical memory or copy the payload data or control data out of the physical memory.

The method 200 may be practiced where the acts are performed to create an IPC channel and a DMA channel for use in a type safe environment in a message-passing oriented platform.

The method 200 may further include sending a control message to a driver process indicating that driver should be aware of a mapped chunk of memory containing control data for the hardware device; sending a small control message indicating a portion of the mapped chunk of memory that has a control message in the portion of the mapped chunk of memory; and un-mapping the mapped chunk of memory when a last portion of the mapped chunk of memory is used to transfer control messages. For example, as illustrated in FIG. 1, a chunk 118 may be mapped as containing control data. A small control message may indicate the address 120 and an offset to identify a larger control message. Once all of the control messages in the chunk 118 have been accessed (i.e. in the illustrated example, the control message at offset 122-$n$ has been accessed), then the chunk can be un-mapped as there are no more relevant control messages in the chunk 118.

The method 200 may be practiced where hardware driver is implemented in user mode. Thus, a switch to kernel mode would not be needed to call the driver 108.

Figure 3:
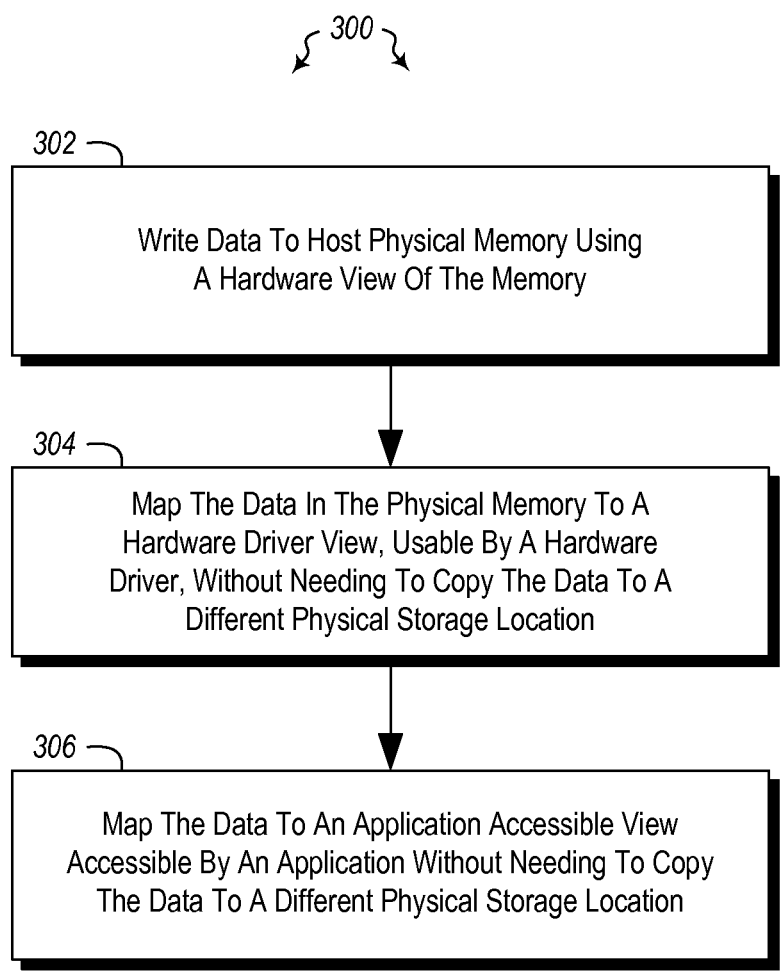
FIG. 3 illustrates another method of communicating between an application and a hardware device.

Referring now to FIG. 3, a method 300 is illustrated. The method 300 may be practiced in a computing environment and includes acts for communicating between an application and a hardware device. The method includes a hardware device writing data to host physical memory using a hardware view of the memory. For example, as illustrated in FIG. 1, the device 106 may write data to the memory 114.

The method 300 further includes mapping the data in the physical memory to a hardware driver view, usable by a hardware driver, without needing to copy the data to a different physical storage location. For example, the data in the memory 114 may be mapped to a driver view usable by the driver 108.

The method 300 further includes mapping the data to an application accessible view accessible by an application without needing to copy the data to a different physical storage location. For example, an application view of the data in the memory 114 for use by the application 104 may be mapped.

The method 300 may be practiced where the physical memory comprises payload data and control messages. In some such embodiments, the method 300 may be practiced where the hardware device is a network interface card and the payload data comprises data frames received by the network interface card.

Embodiments may accomplishing flow control by leaving the payload data and control data in the physical memory until the hardware device has provided an indication (such as a hardware interrupt) indicating completion of an operation, without needing to retire data from the physical memory or copy the payload data or control data out of the physical memory.

The method 300 may be practiced where the acts are performed to create an inter-process communication (IPC) channel and a direct memory access (DMA) channel for use in a type safe environment in a message-passing oriented platform.

The method 300 may further include sending a control message to a driver process indicating that driver should be aware of a mapped chunk of memory containing control data for the hardware device; sending a small control message indicating a portion of the mapped chunk of memory that has a control message in the portion of the mapped chunk of memory; and un-mapping the mapped chunk of memory when a last portion of the mapped chunk of memory is used to transfer control messages. As illustrated in other examples, this allows smaller control messages to be sent and the time the control messages are needed by issuing pointers to larger control messages.

The method 300 may be practiced where the hardware driver is implemented in user mode.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising one or more processors and a physical memory, a method of limiting an amount of data that is copied when communicating between an application and a hardware device, the method comprising:
   an application writing data to a physical memory using an application view of the physical memory;
   mapping the data in the physical memory to a hardware driver view, usable by a hardware driver, without copying the data to a different physical storage location; and
   mapping the data in the physical memory to a hardware accessible view accessible by a hardware device without copying the data to a different physical storage location,
   wherein the physical memory comprises a mapped chunk of memory holding a plurality of control messages at different offsets of the mapped memory for communicating with the hardware device, and wherein mapping the data to the hardware accessible view comprises communicating to the hardware device an offset in the mapped chunk of memory corresponding to each control message, enabling the hardware device to retrieve each control message from the mapped chunk of memory.

2. The method of claim 1, wherein the physical memory comprises payload data and the control messages.

3. The method of claim 2, wherein the hardware device is a network interface card and the payload data comprises data frames to be transmitted.

4. The method of claim 2, further comprising:
   accomplishing flow control by leaving the payload data and the control messages in the physical memory until the hardware device has provided an indication of completion of an operation, without retiring data from the physical memory or copying the payload data or the control messages out of the physical memory.

5. The method of claim 1, wherein the acts are performed to create an inter-process communication (IPC) channel and a direct memory access (DMA) channel for use in a type safe environment in a message-passing oriented platform.

6. The method of claim 1, further comprising:
   un-mapping the mapped chunk of memory when a last portion of the mapped chunk of memory is used to transfer the control messages.

7. The method of claim 1, wherein the hardware driver is implemented in user mode.

8. In a computing environment, a method of limiting an amount of data that is copied when communicating between an application and a hardware device, the method comprising:
   a hardware device writing data to a physical memory using a hardware view of the physical memory;
   mapping the data in the physical memory to a hardware driver view, usable by a hardware driver, without copying the data to a different physical storage location; and
   mapping the data to an application accessible view accessible by an application without copying the data to a different physical storage location,
   wherein the physical memory comprises a mapped chunk of memory holding a plurality of control messages at different offsets of the mapped memory for communicating with the hardware device, and wherein the hardware view of the physical memory communicates to the hardware device an offset in the mapped chunk of memory corresponding to each control message, thereby enabling the hardware device to retrieve each control message from the mapped chunk of memory.

9. The method of claim 8, wherein the physical memory comprises payload data and the control messages.

10. The method of claim 9, wherein the hardware device is a network interface card and the payload data comprises data frames received by the network interface card.

11. The method of claim 9, further comprising:
accomplishing flow control by leaving the payload data and the control messages in the physical memory until the hardware device has provided an indication of completion of an operation, without retiring data from the physical memory or copying the payload data or the control messages out of the physical memory.

12. The method of claim 8, wherein the acts are performed to create an inter-process communication (IPC) channel and a direct memory access (DMA) channel for use in a type safe environment in a message-passing oriented platform.

13. The method of claim 8, further comprising:
un-mapping the mapped chunk of memory when a last portion of the mapped chunk of memory is used to transfer the control messages.

14. The method of claim 8, wherein the hardware driver is implemented in user mode.

15. A system comprising:
one or more processors;
a hardware device;
system memory; and
one or more hardware storage devices having stored thereon computer-executable instructions that, when executed by the one or more processors, limit an amount of data that is copied in the system memory when facilitating communication between an application executing at the one or more processors and the hardware device, wherein the computer-executable instructions cause the computer system to perform at least the following:
presenting an application view of the system memory to the application, wherein when the application produces first payload data to be sent to the hardware device or consumes second payload data from the hardware device, the application writes the first payload data to the system memory or reads the second payload data from the system memory using the application view of the system memory;
presenting a hardware driver view of the system memory to a hardware driver, wherein when the hardware driver to produces or consumes control data, the hardware driver accesses the system memory using the hardware driver view of the system memory; and
presenting a hardware device view of the system memory to the hardware device, wherein the hardware device is configured to receive the first payload data directly from the system memory and write the second payload data directly to the system memory using the hardware device view of the system memory, such that the first payload data and the second payload data are transferred between the hardware device and the application, and the control data is transferred between the driver and the hardware device without actually copying the data,
wherein the memory comprises a mapped chunk of memory holding the control data, the control data comprising a plurality of control messages at different offsets of the mapped memory for communicating with the hardware device, and wherein the hardware device view of the system memory communicates to the hardware device an offset in the mapped chunk of memory corresponding to each control message, thereby enabling the hardware device to retrieve each control message from the mapped chunk of memory.

16. The system of claim 15, wherein the hardware device is a network interface card and the payload data comprises data frames to be transmitted.

17. The system of claim 15, wherein the system is configured to accomplish flow control by leaving the payload data and the control data in the system memory until the hardware device has provided an indication indicating completion of an operation, without retiring data from the system memory or copying the payload data or the control data out of the system memory.

18. The system of claim 15, wherein the system implements an inter-process communication (IPC) channel and a direct memory access (DMA) channel for use in a type safe environment in a message-passing oriented platform.

19. The system of claim 15, wherein the hardware driver is implemented in user mode.

* * * * *